Oct. 16, 1962   R. H. DU HAMEL ET AL   3,059,234
LOGARITHMICALLY PERIODIC ANTENNA ARRAY
Filed Sept. 21, 1959   16 Sheets-Sheet 1

INVENTORS
RAYMOND H. DUHAMEL
DAVID G. BERRY
BY
ATTORNEYS

E-PLANE $\alpha = 14.24°$
$\tau = .83$

H-PLANE

E-PLANE $\alpha = 18.7°$
$\tau = .83$

H-PLANE

E-PLANE $\alpha = 24°$
$\tau = .83$

H-PLANE

INVENTORS
RAYMOND H. DuHAMEL
DAVID G. BERRY
BY
ATTORNEYS

HALF POWER BEAM WIDTH Vs. $\tau$
OF SINGLE ELEMENTS

INVENTORS
RAYMOND H. DUHAMEL
DAVID G. BERRY
BY
ATTORNEYS

PHASE OF RADIATED FIELD Vs.
SCALE FACTOR (K)

1800 M.C.

1700 M.C.

Oct. 16, 1962  R. H. DU HAMEL ET AL  3,059,234
LOGARITHMICALLY PERIODIC ANTENNA ARRAY
Filed Sept. 21, 1959  16 Sheets-Sheet 8

INVENTORS
RAYMOND H. DuHAMEL
DAVID G. BERRY
BY
ATTORNEYS

H-PLANE

E-PLANE

1450 M.C.

H-PLANE

E-PLANE

1700 M.C.

H-PLANE

1400 M.C.

H-PLANE

1500 M.C.

H-PLANE

1600 M.C.

H-PLANE

1700 M.C.

Oct. 16, 1962    R. H. DU HAMEL ET AL    3,059,234
LOGARITHMICALLY PERIODIC ANTENNA ARRAY
Filed Sept. 21, 1959                    16 Sheets-Sheet 14

INVENTORS
RAYMOND H. DuHAMEL
DAVID G. BERRY
BY Moody and Phillips
ATTORNEYS

Oct. 16, 1962  R. H. DU HAMEL ET AL  3,059,234
LOGARITHMICALLY PERIODIC ANTENNA ARRAY
Filed Sept. 21, 1959  16 Sheets-Sheet 15

INVENTORS
RAYMOND H. DU HAMEL
DAVID G. BERRY
BY
ATTORNEYS

United States Patent Office 3,059,234
Patented Oct. 16, 1962

3,059,234
LOGARITHMICALLY PERIODIC ANTENNA
ARRAY
Raymond H. Du Hamel and David G. Berry, Cedar Rapids, Iowa, assignors to Collins Radio Company, Cedar Rapids, Iowa, a corporation of Iowa
Filed Sept. 21, 1959, Ser. No. 841,391
22 Claims. (Cl. 343—795)

This invention relates generally to antenna arrays and more specifically to frequency independent end fire antenna arrays employing logarithmically periodic antennas as described in patent application Serial No. 721,408, filed March 14, 1958, by Raymond H. Du Hamel and Fred R. Ore entitled "Logarithmically Periodic Antenna" and patent application Serial No. 804,357, now Patent No. 2,989,749, filed April 6, 1959, by Raymond H. Du Hamel and David G. Berry and entitled "Unidirectional Frequency-Independent Coplanar Antenna," both of which are incorporated by reference as a part of this specification.

In the prior art there are known many forms of end fire antenna arrays. For example, a group of dipoles can be arranged parallel to each other similar to the arrangement of the rungs in a ladder to form an array. The pattern for any given frequency is determined by the spacing between the various individual antennas, said spacing being measured in wavelengths. It is well known that as the frequency changes the wavelength spacing between the various antennas will change, thus causing a change in the radiation pattern and also producing a change in antenna impedance. The aforementioned characteristics, i.e., change of impedance and radiation pattern with frequency, exist in all known end fire antenna array systems. Now, it is possible, by employing a large number of antennas, and by switching from one group of antennas to another group of antennas as the frequency shifts over wide ranges, to maintain a somewhat constant pattern and a somewhat constant impedance. The degree of constancy in impedance and pattern will be dependent upon the complexity and number of antennas employed. The higher the degree of constancy desired, the greater the complexity will be. Such a procedure for obtaining a wide frequency bandwidth antenna system is quite expensive, quite space consuming, and in many cases is not practical. It is evident that it would be quite desirable to have an antenna array capable of producing a highly directive beam pattern which would remain constant over large frequency changes and having an impedance which would also remain substantially constant over large frequency changes.

Recently a new-type antenna such as described in the above-identified patent applications 721,408 and 804,357 has been developed. This new-type antenna known generally as a logarithmically periodic antenna is comprised of individual antenna elements, each element being generally triangular in shape and having a vertex and side elements defined by an angle α. More specifically, each element is comprised of at least two radial sections defined on one side by the center line of the antenna element and on the other side by a radial line extending from the vertex at an angle $$\frac{\alpha}{2}$$

Each of these radial members is comprised of a plurality of teeth which are all similar to each other in shape but which become progressively larger and spaced progressively farther apart as the distance from the vertex increases. The above relationship may be expressed by stating that the radial distance from the vertex to any point on any given tooth in a specific radial member bears a constant ratio τ to the radial distance from the vertex to the corresponding point on the next adjacent tooth which is farther removed from the vertex than said given tooth. In the most general case where each antenna element employs two radial members lying in the same plane, the teeth of one radial member are positioned opposite the gaps of the other radial member.

An object of the present invention is to provide an antenna array capable of providing a radiation pattern which will remain constant over large changes in frequency.

Another object of the invention is an antenna array whose impedance remains substantially constant over large changes of frequency.

A third object of the invention is to provide a reliable and relatively simple antenna array employing logarithmically periodic antenna elements in which the impedance and the radiation pattern remain substantially constant over large changes of frequency.

Another object of the invention is the improvement of antenna arrays generally.

In accordance with the invention there is provided some even number of logarithmically periodic antenna elements arranged either in a coplanar or nonplanar relationship or some combination of coplanar and nonplanar relationship with respect to each other. In order to maintain substantially constant pattern and impedance over large frequency changes it is necessary that the locations of the elements with respect to each other be defined by angles rather than distances. By definition the foregoing sentence means that all of the elements of the array will have their vertices (or feed points) at a common point. The particular radiation pattern desired can be obtained by selecting the proper values for $\alpha$, $\beta$, $\psi$, and $\zeta$, and $\tau$, as defined in the aforementioned copending application, Serial Number 721,408.

Due to the fact that the vertices of the individual elements of the array meet at a common point, the phase centers of the individual elements of the array will lie in an arc about said common vertex and will not lie in a straight line, thus preventing the formation of a plane wave front. The foregoing sentence assumes that all of the antenna elements have the same construction and are fed by signals having the same phase.

It is to be noted that arrays can be formed to produce horizontally polarized fields, vertically polarized fields, or elliptically polarized fields, or the special case of circularly polarized fields. In the case of the elliptically or circularly polarized fields the antenna arrays can be composed of a plurality of antenna elements each of which has more than two radial elements connected to a single central conductive member. Alternatively, elliptically or circularly polarized fields may be generated by a plurality of groups of two pairs of individual antenna elements having a common vertex and arranged in quadrature.

An important feature of the invention is the fact that all of the linear dimensions (i.e. radial distances measured from the vertex) of an antenna element may be either shrunk or stretched by a constant factor to produce a change in the phase relationship between the signal at the feed point and a signal at the phase center of the element without changing the distance of the phase center of the element from the vertex. Thus, by properly stretching or shrinking an antenna element or antenna group the phase of the radiated signal therefrom can be altered to compensate for the difference in phase with respect to the radiated signal of another element or group so as to produce a common phase at a given reference plane representative of the electric field in space.

The above-mentioned and other features and objects of the invention will be more fully understood from the detailed description thereof when read in conjunction with the drawings, in which.

Figure 1:
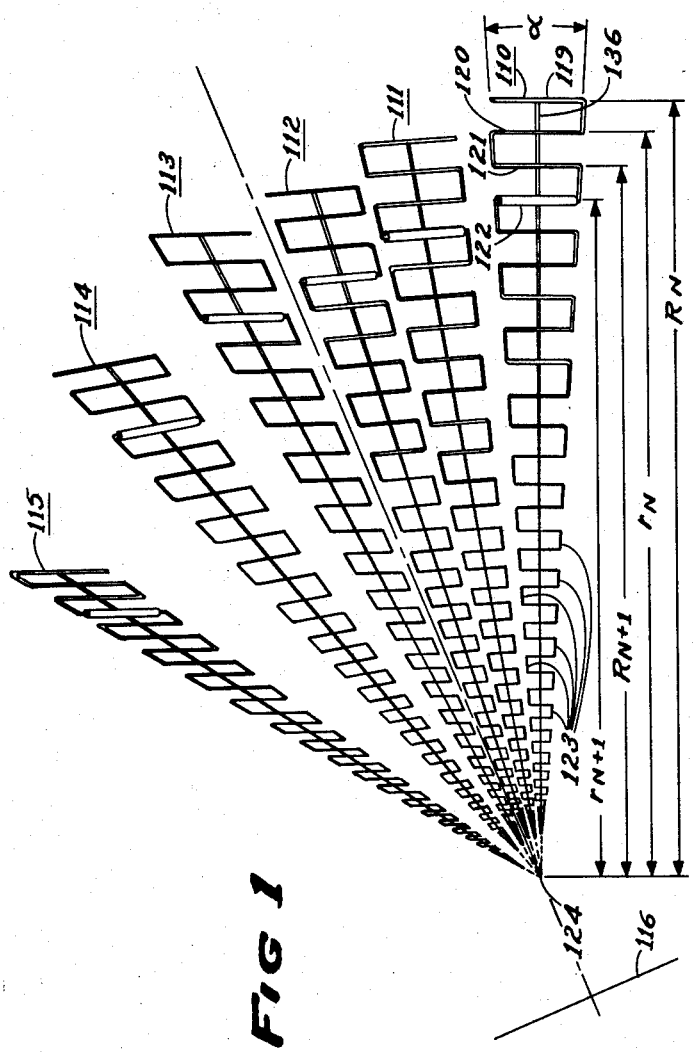
FIG. 1 shows a perspective view of a nonplanar array of six logarithmically periodic antenna elements.
Figure 6A:
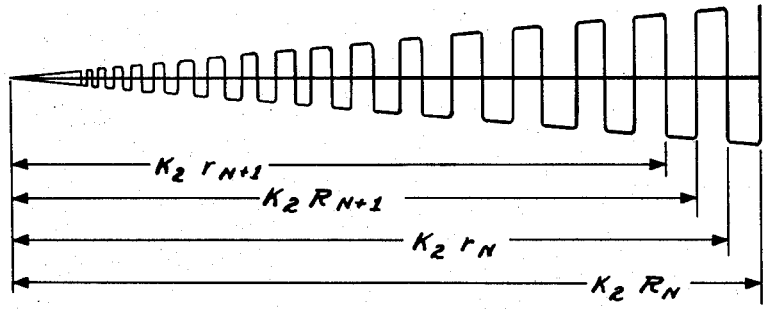
Figure 6B:
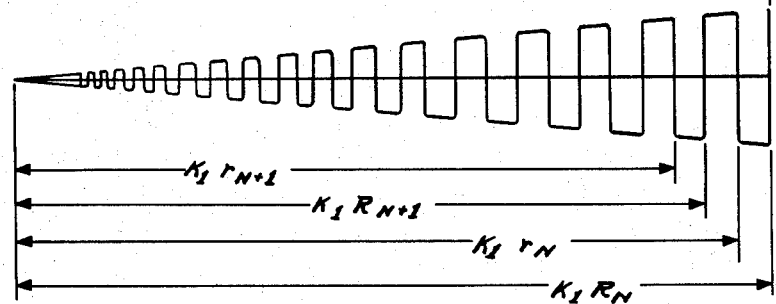
Figure 6C:
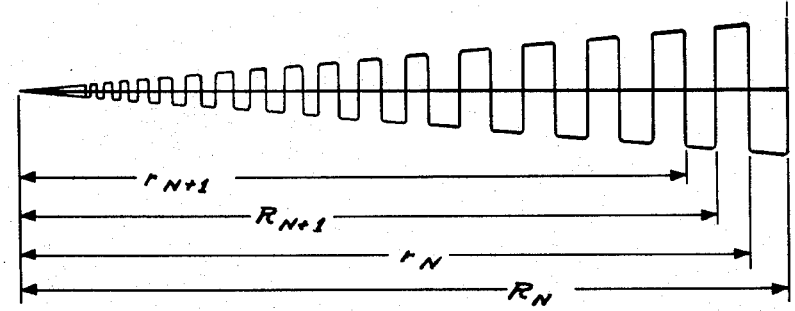
Figure 7:
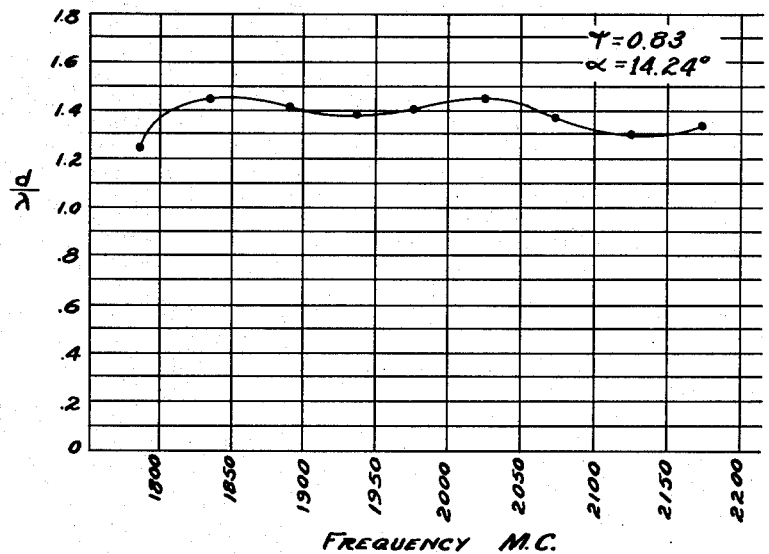
Figure 8:
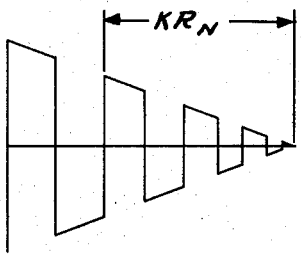
Figure 9:
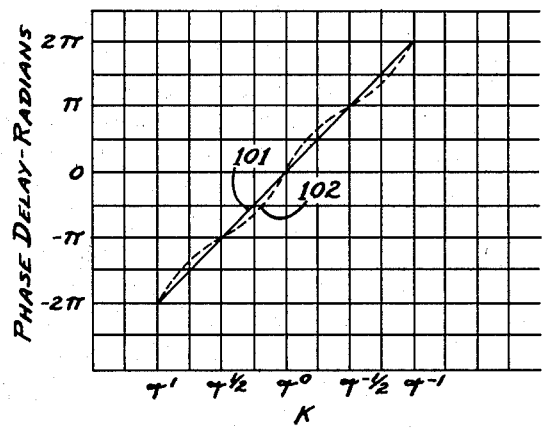
Figure 10A:
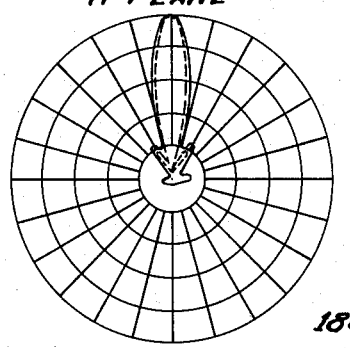
Figure 10B:
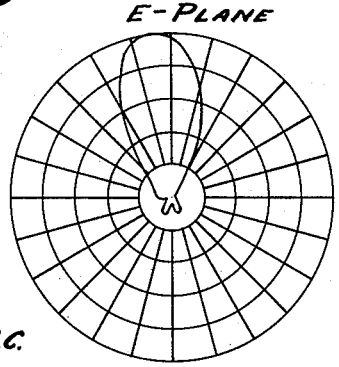
Figure 10C:
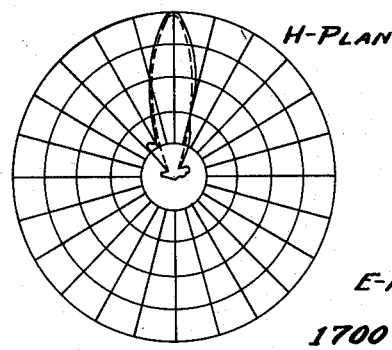
Figure 10D:
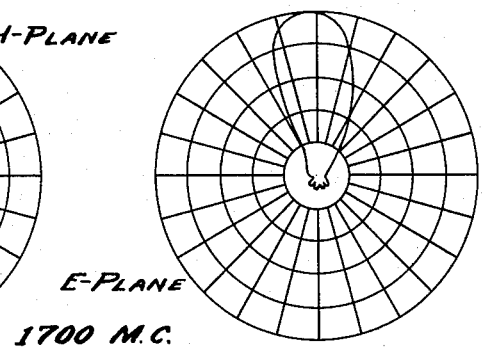
Figure 11:
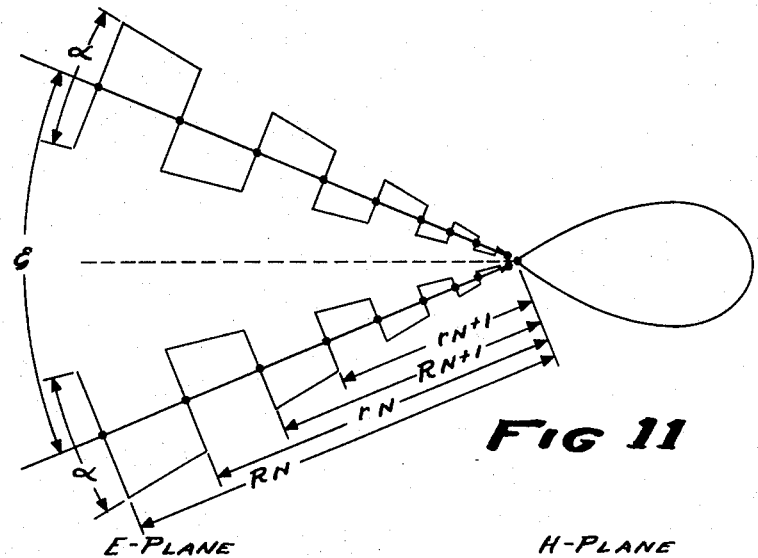
Figures 12A, 12B:
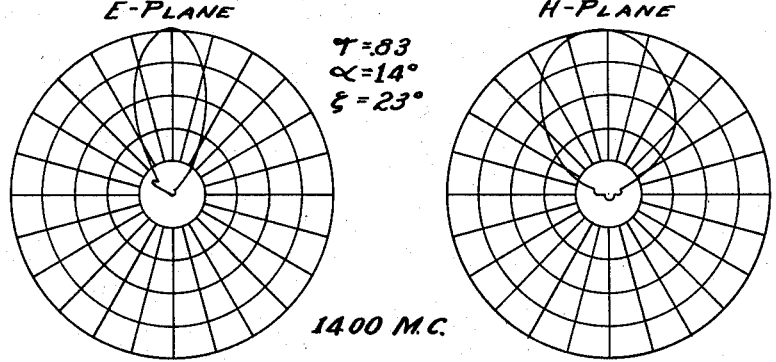
Figures 12C, 12D:
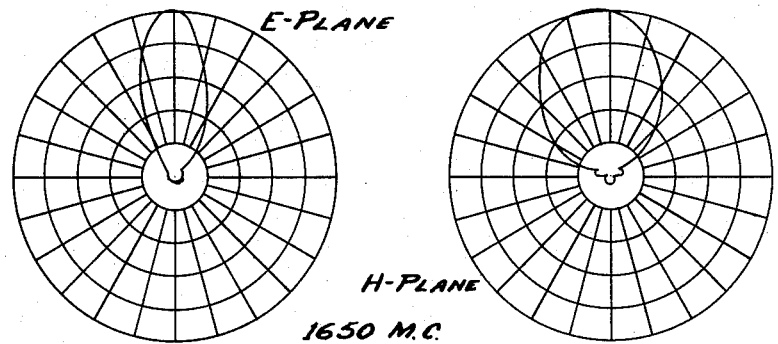
Figure 13:
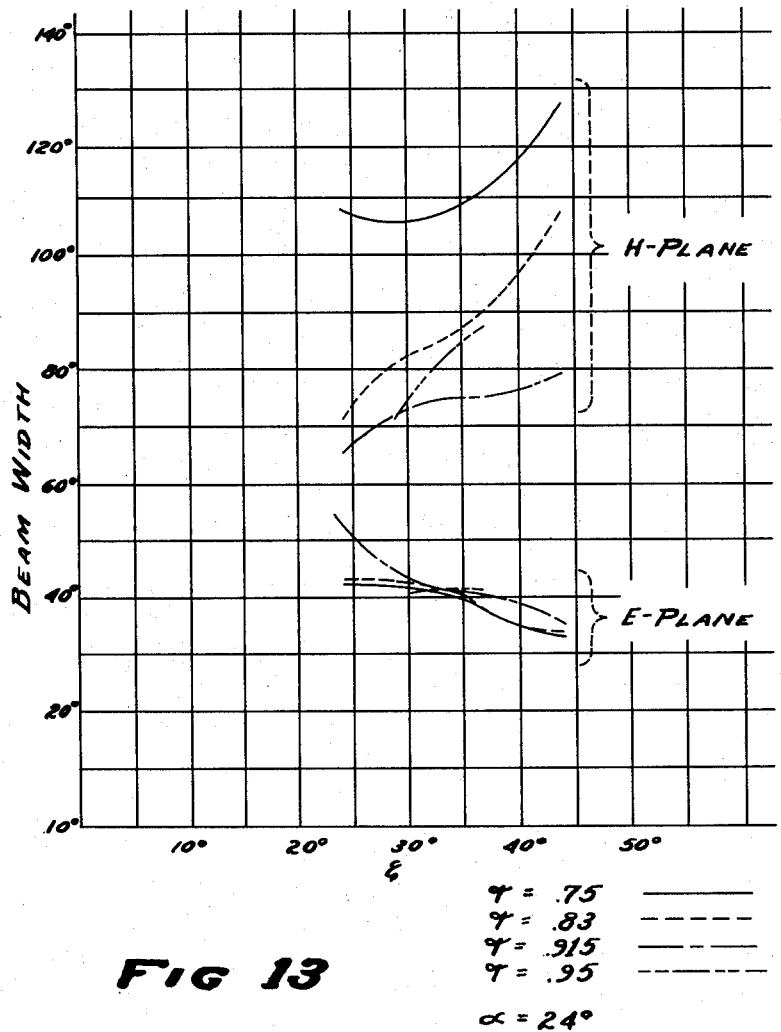
Figure 14:
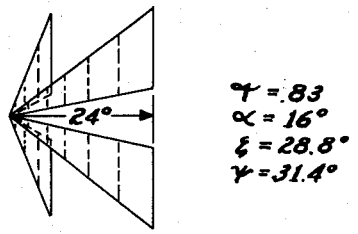
Figure 15A:
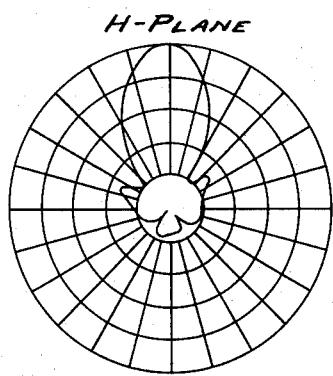
Figure 15B:
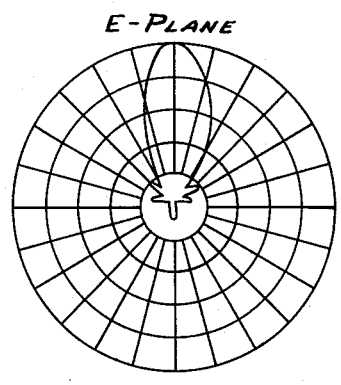
Figure 15C:
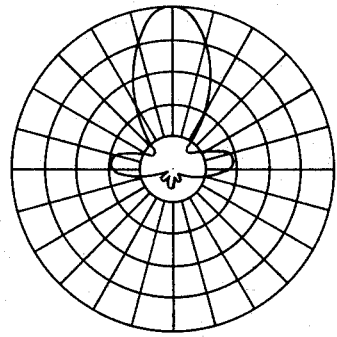
Figure 15D:
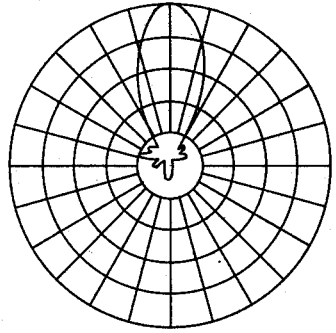
Figure 16:
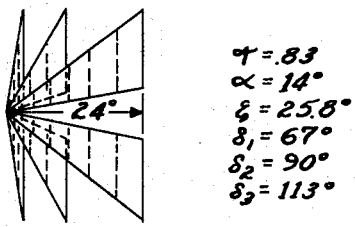
Figure 17A:
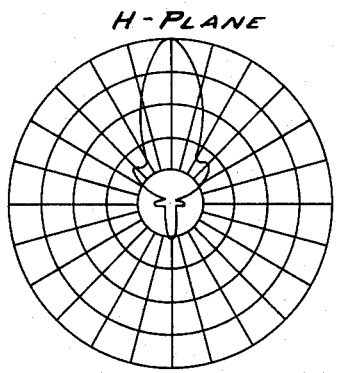
Figure 17B:
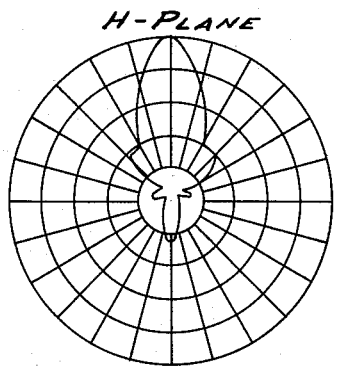
Figure 17C:
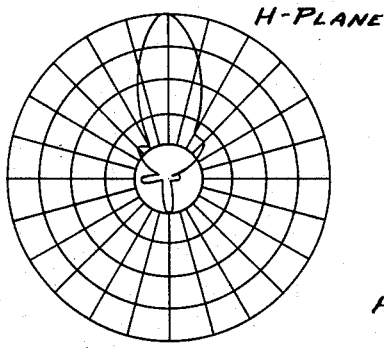
Figure 17D:
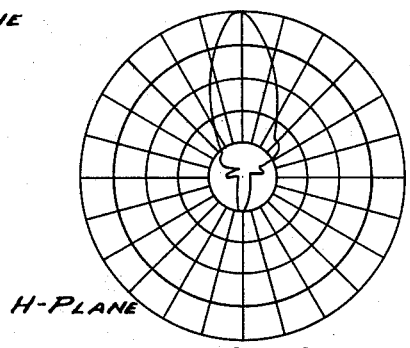
Figure 18:
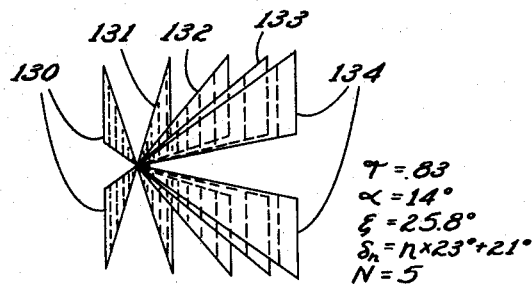
Figure 19A:
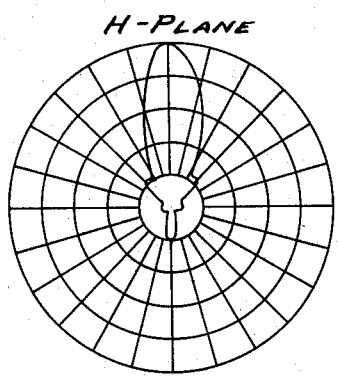
Figure 19B:
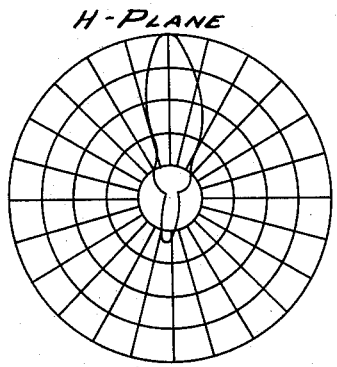
Figure 19C:
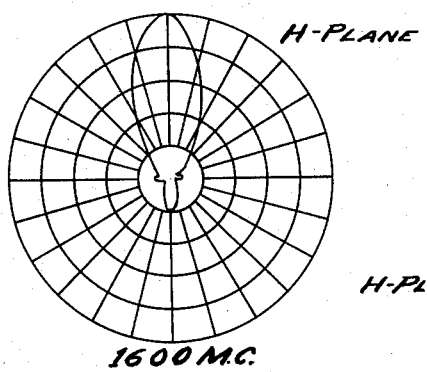
Figure 19D:
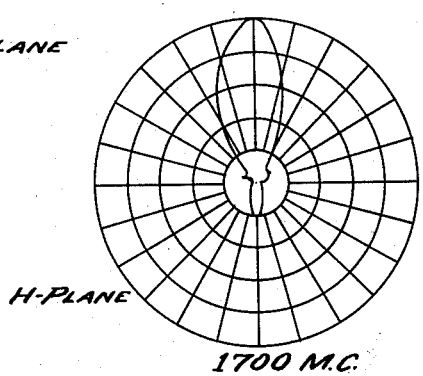
Figure 26:
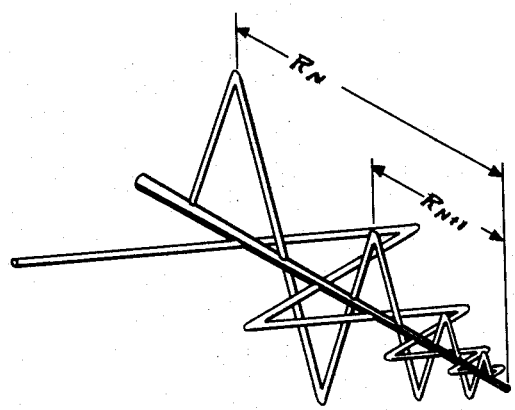
Figure 27:
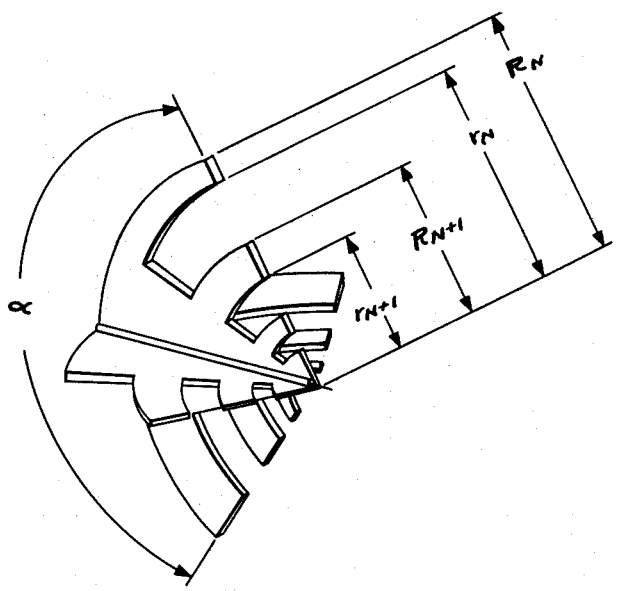
Figure 28:
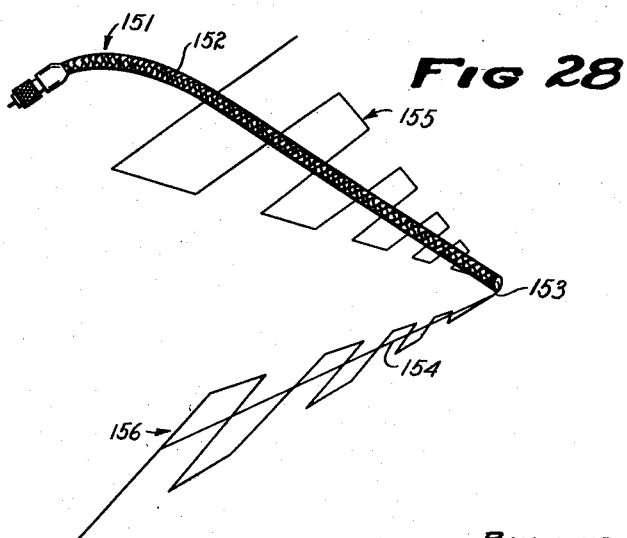

FIGS. 6a, 6b, and 6c, show a plane view of three of the six antenna elements of FIG. 1 and illustrate the relationship of the dimensions of the three elements;

FIG. 7 shows a chart of the relationship of the phase center of an antenna element vs. changes of frequency;

FIG. 8 is an elementary diagram of an antenna element showing one of the dimensions multiplied by a stretching factor $k$;

FIG. 9 is a chart showing the relationship between the phase delay of an antenna element as it varies with different stretching factors;

FIGS. 10a through 10d show the predicted and the measured H and E plane radiation fields for a six-element phased array at two different frequencies;

FIG. 11 show a pair of coplanar elements which may be utilized with other pairs of antenna elements to form an array;

FIGS. 12a through 12d show radiation patterns of a two-element coplanar array such as shown in FIG. 11;

FIG. 13 is a chart showing half-power beam width vs. the angle of separation of the center lines of two-element coplanar arrays;

FIG. 14 is a schematic sketch of a four-element array of identical elements;

FIGS. 15a through 15d show E and H plane radiation patterns of the four-element array of FIG. 14 for two different frequencies;

FIG. 16 shows a six-element array of identical elements;

FIGS. 17a through 17d show the radiation patterns for the H plane only of the array of FIG. 16 for four different frequencies;

FIG. 18 shows a ten-element array which can produce an electrically steerable radiation pattern;

FIGS. 19a through 19d show radiation patterns in the H plane for the steerable array of FIG. 18;

FIGS. 20, 21, 22, and 23 show various types of antenna elements for logarithmically periodic antenna arrays which may be employed in the various arrays described herein;

FIGS. 24, 25, 26, and 27 shows antenna element configurations which can be employed to generate elliptically or circularly polarized radiation patterns; and FIG. 28 shows the means for feeding a logarithmic periodic antenna array with a coaxial cable.

Referring now to FIG. 1 there is shown a six element coplanar array comprised of elements 110, 111, 112, 113, 114, and 115. Each of these elements feeds against the adjacent elements. More specifically, element 110 feeds against element 111, element 111 feeds against elements 110 and 112, and element 112 feeds against elements 111 and 113, etc. Although there is some interaction between adjacent elements due to the fact that they are not image elements, the resultant array can be calculated with a high degree of accuracy on the contribution of each individual element, disregarding the interaction with adjacent elements. In the particular embodiment of the invention shown in FIG. 1, if a plane 116 is drawn perpendicular to the bisector of the angle between elements 110 and 115, the phase centers of the elements 110, 111, 112, 113, 114 and 115 would, in the absence of stretching or shrinking of certain of the elements, be at different normal distances from the line 116. More specifically, the phase centers of elements 112 and 113 would be farther from the line 116 than would be the phase centers of the elements 110 and 115 or 111 and 114. Under certain circumstances this would be an undesirable situation. For example, if it is desired to generate a plane radiation pattern in the H field (a plane formed by the center lines of the elements 110 through 115) the phase of the signal radiated by each element should be the same as it reaches the plane 16. Such a phased array can be accomplished by shrinking or stretching various ones of the antenna elements in a manner to be described in detail later herein. For the present the characteristics and definitions of an individual logarithmically periodic antenna will be discussed briefly.

In FIG. 1, $R_N$ is the distance from the vertex to the wire element 119 of element 110, $r_N$ is the distance from the vertex to the wire element 120 of element 110, $R_{N+1}$ is the distance from the vertex to wire element 121 and $r_{N+1}$ is the distance from the vertex to the wire element 122. The following ratios exist:

$$\frac{R_{n+1}}{R_n}=\frac{r_{n+1}}{r_n}=\tau$$

and $$\frac{r_n}{R_n}=\sigma$$

The angle $\alpha$ defines the side elements such as sides 123 of the wire forming the shaped configuration. To obtain structural symmetry of the element, $\sigma=\sqrt{\tau}$.

The antenna element such as antenna element 110 (FIG. 1) when fed against another similar antenna element such as element 111 will have a natural tendency to produce a radiation pattern off the end of the antenna element. Such radiation field or pattern is ordinarily defined as having an H plane and an E plane. The H field lies in the plane perpendicular to the individual transverse elements such as elements 122 and 121 of antenna element 110 and passing through the central conductive member such as member 136. The E field is the field lying in the plane parallel to transverse elements such as elements 122 and 121 and passing through the bisector of angle formed by the end antenna elements 110 and 115. Another term frequently used in connection with logarithmically periodic antenna elements are "image elements" and "non-image elements." Image elements are defined as a pair of elements which are positioned so as to be substantially mirror images of each other. Non-image elements exist when one element of a pair of image elements is rotated about its center line 180°. In the structure of FIG. 1 antenna element 110 is a non-image of element 111.

Throughout much of this discussion of antenna arrays the particular type antenna element employed as an example will be the type shown in FIG. 1, i.e., the type having rectangularly shaped teeth formed of a wire or a rod. It is to be understood, however, that other type antenna elements such as the antenna elements shown in FIGS. 20 through 27, and others, may be substituted freely for the type depicted in FIG. 1.

In the following paragraphs the theory and element characteristics of an array will be discussed in some detail. Subsequently, the specific method for construction of an array to produce a desired pattern will be discussed.

Figure 2:
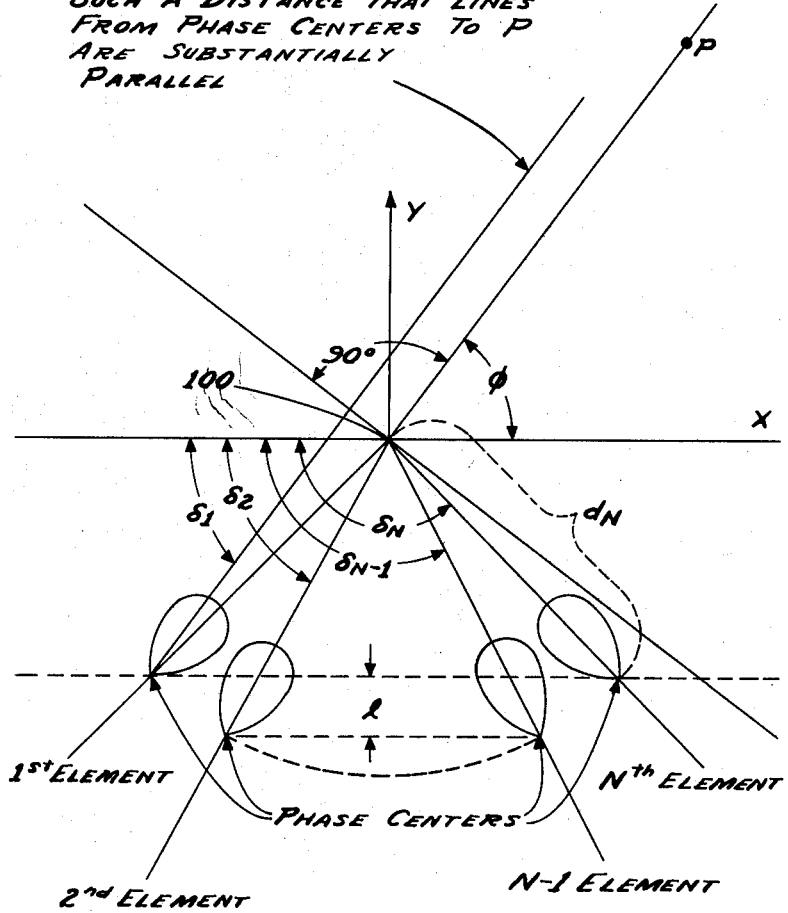
FIG. 2 shows a schematic diagram of logarithmically periodic antenna elements arranged in an array with vertices of the various elements meeting at a substantially common point.
Figure 3A:
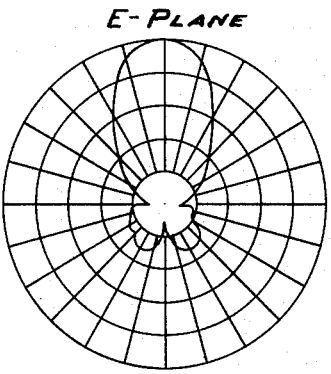
FIGS. 3a through 3f show predicted vs. measured patterns of six elements.
Figure 3B:
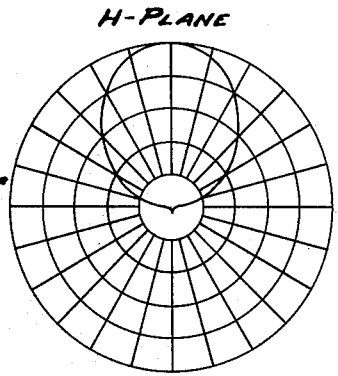
Figure 3C:
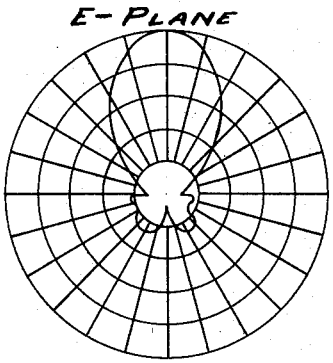
Figure 3D:
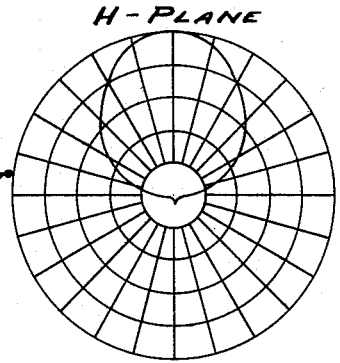
Figure 3E:
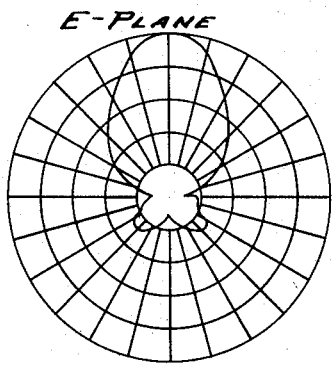
Figure 3F:
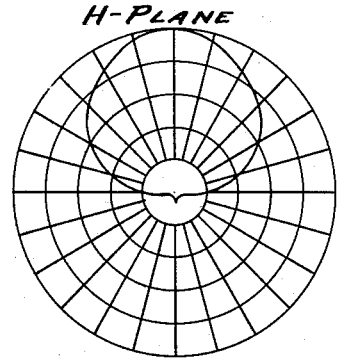

Considering now the general theory of an array using logarithmically periodic antennas, reference is made to FIG. 2 which shows an array of end fire elements. All of these elements have their vertex (or apex) at a common point 100. It is to be noted specifically that the antennas are not electrically connected at this common point 100. In actual practice the antennas are terminated short of their vertex so that actual connections between the various elements are not thereby effected. The odd-numbered antenna elements are supplied from one wire of a transmission line and the even-numbered elements are supplied from the other wire of a transmission line. In a general sense it will be observed in FIG. 2 that the resultant radiation pattern is controlled by three principal factors. The first of these factors is the radiation pattern of each individual element. The means for determining the radiation pattern of each individual element will be discussed later. The second factor is the fact that each of the elements radiates in a different direction from every other element. More specifically, each element radiates in a direction determined by its angle $\delta$ which results in the phase centers of the various elements to be at different distances from a plane parallel to the direction of radiation. The phase center is defined as the apparent point from which radiation is originating. For example, assuming the Z coordinate to be perpendicular to the plane of the drawing of FIG. 2, the phase centers of elements 1 and N will be closer to the XZ plane than the phase centers of elements 2 and N−1. It is apparent that if it is desired to create an array that will radiate a directive beam symmetrically about the Y axis, for example, it would be desirable to have the phases of all of the elements the same as they pass through any plane perpendicular to the direction of radiation such as, for example, X—Z plane. By a procedure to be explained in detail later the phases of signals radiated by elements 2 and N−1 can be caused to lead the phases of the signals radiated by elements 1 and N by an amount equal to the distance $l$ measured in wavelengths. The distance $l$, as measured in wavelengths, remains constant with a change in frequency due to the inherent characteristics of logarithmically periodic antennas. More specifically, as the phase centers move toward the vertex with signals of higher frequency, the distance $l$ will decrease in actual distance but will remain the same as measured by wavelengths which become shorter as the frequency becomes higher.

The general expression for the radiation pattern of the array shown in FIG. 2 is given by $$E(\phi) = \sum_{n=1}^{N} A_n f(\phi - \delta_n) e^{-j[\beta d \cos(\phi - \delta_n) - \gamma_n]} \quad (1)$$

where $f(\phi - \delta_n)$ represents the radiation pattern configuration of each element and where the portion $d \cos(\phi - \delta_n)$ of the exponent represents the phase advance of the phase center relative to the origin 100, the values $d$, $\phi$, and $\delta$ being indicated in FIG. 2. The value of the feed-point voltage for the $n^{th}$ element is given by $A_n$. The parameter $\gamma_n$ is the relative phase of the field radiated from the $n^{th}$ element. More specifically, $\gamma_n$ is the change in phase introduced into any given element by stretching or shrinking that element so as to produce a desired phase relationship between the fields radiated by the various elements. As indicated hereinbefore, shrinking or stretching an element will result in a phase shift of the radiated signal with respect to the phase of the input (or feed) signal.

The assumptions made in Equation 1 are that the element patterns and input impedances are identical. Although mutual effects can introduce some error into these assumptions, good correlation between theory and experiment has been obtained. As indicated above, it is necessary, in the construction of an array, to determine the radiation pattern of each individual element used therein. The radiation pattern of a single element will depend primarily upon the design parameters $\alpha$ and $\tau$. Since it is necessary to feed two logarithmically periodic elements against each other in order to obtain frequency independent operation, it would appear difficult to determine the radiation characteristics of a single element. It has been found that this difficulty can be circumvented by feeding a logarithmically periodic element against a vertical wire which is perpendicular to the teeth of the logarithmically periodic element and which is connected to the center conductor of a coaxial cable, which cable forms the center line of the logarithmically periodic antenna element.

Although the input impedance of the element is no longer frequency independent, the patterns are very similar to the patterns of the element when placed in an array. Since the vertical wire radiates vertical polarization in the E field, it is possible to measure the principal plane horizontal polarization patterns (in the E field) of a periodic element alone. This technique can also be employed to determine the phase center of a single element.

Figure 4:
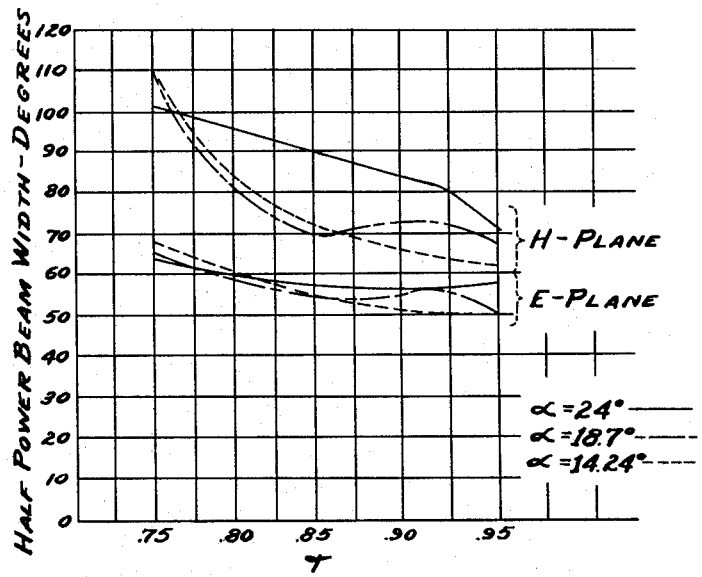
FIG. 4 is a chart showing the relationship radiated of beam width vs. $\tau$, both for the H plane and the E plane where $\tau$ is the ratio of the radial distance from the vertex as defined in the above-mentioned copending application, Serial Number 721,408.

Sample patterns for various values of the parameters $\alpha$ and $\tau$ are shown in FIGS. 3a through 3f. These are relative field intensity patterns. The main beam in each case represents the end fire characteristic of the single element. The graph of FIG. 4 summarizes the pattern data taken on the various types of elements. It is to be noted that the E plane beam widths are relatively insensitive to change in $\tau$ but that the H beam widths generally decrease with increasing $\tau$. The graph of FIG. 7 will be employed in a manner to be described later in selecting the constants to be used in constructing an array having a desired radiation pattern.

Figure 5:
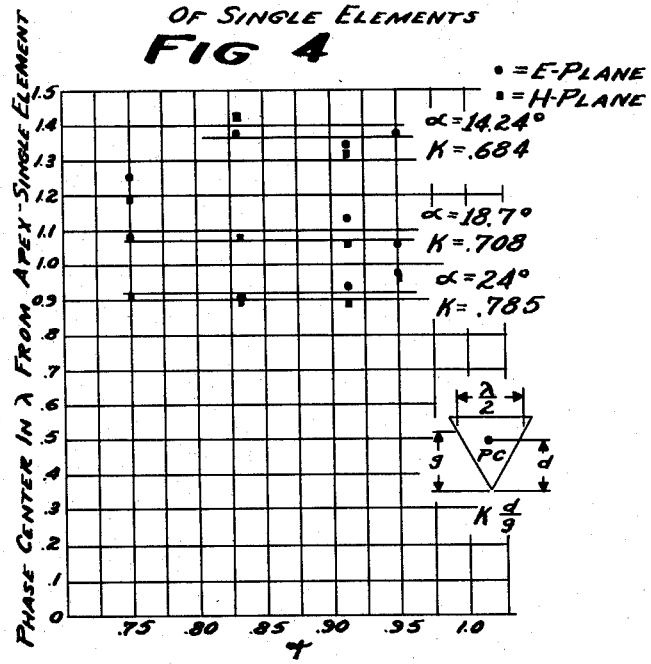
FIG. 5 is a chart showing the variations of the phase centers of single antenna elements as $\tau$ varies for different antenna configurations.

The phase centers of the elements can be determined by mounting the elements on a vertical rotating mast and measuring the phase of the received signal at a distant antenna. The center of rotation of the element is adjusted so that the phase variation over a 60° sector in the direction of radiation was minimum. It was found that the distance $d$, that is the wavelengths to the vertex from the phase center, was essentially independent of $\tau$ but quite dependent upon $\alpha$. The results of the immediately aforementioned tests are shown by the curves of FIG. 5.

The phase center position of various logarithmically periodic elements was measured over a period of frequency. A typical result is shown in FIG. 7. Since $d$ is proportional to the wavelengths within the accuracy of the measuring equipment, it can be implied from the curve that the phase center does not shift when a logarithmically periodic element is expanded or contracted, by some constant K. Worded in another way it can be stated that the phase center is substantially independent of the number of teeth between said phase center and the vertex (within certain limitations) as long as $\tau$ and $\alpha$ remain constant.

The concept of shrinking or stretching an antenna element is a rather important one in the consideration of antenna arrays employing logarithmically periodic antenna elements. To clarify the concept the following analogy might be useful. Assume the antenna element is composed of a spring wire formed in the shape of an element shown in FIG. 1 and fastened securely to some fixed point at the vertex. Now, if the end of the antenna opposite the vertex is moved away from the fixed vertex, the antenna will be stretched, i.e. every point in the antenna will move out from the apex radially by a constant factor K. Conversely, if the antenna is compressed back toward the apex it is said to be shrunk and every point in the antenna is moved back toward the apex by a constant factor K. In order for the foregoing analogy to be valid two assumptions must be made. The first assumption is that the bending point of the spring must not be exceeded. The second assumption is that if a spring were in fact streched as described above, the angle determined by the outer edges of the spring would vary, decreasing with stretching and increasing with compression. In the case of stretching or compressing an antenna this angle $\alpha$ must remain the same. Consequently, it can be seen that the analogy of the spring is not a completely accurate analogy. An additional point to be noted is that a stretched or shrunk antenna should have the same over-all length as another antenna which is stretched or shrunk in a different degree.

However, even though the phase center of an element does not vary when stretched or shrunk it has been found experimentally that the phase of the radiated signal at the phase center will vary with respect to the phase of the input signal fed to the vertex. This characteristic of logarithmically periodic antennas is defined as the phase rotation phenomenon. It has been verified experimentally that when an element is shrunk or stretched through one complete period, the phase of the signal would be advanced or delayed 360°.

In FIG. 8 the distance to an element is given by $KR_N$. The expansion through a period is accomplished by letting K increase from one to $1/\tau$. During this expansion all lengths involved in the structure are multiplied by K. In FIG. 9 the phase delay in radians is plotted versus the logarithm of K to the base $\tau$. The ideal phase variation is given by the solid straight line. Measurements have indicated that the actual phase variation is somewhat like the dashed line. The measurements made to date indicate that the deviation of the dashed line from the straight line is not more than 20°.

It is to be noted that the phase of a signal will be advanced 360° when the structure is shrunk through a complete period. Somewhat different expressions are used to define shrinkage and stretching. For shrinkage the expression for K in term of $\gamma$ is:

$$K = \tau^{\frac{-\gamma_n}{2\pi}}$$

where $\gamma$ equals the amount of phase delay in radians.

For stretching an element the relationship between K and $\gamma$ is as follows:

$$K = \tau^{\frac{-\gamma_n}{2\pi}}$$

where $\gamma$ equals the phase advancement in radians. The phase center and the radiation patterns are substantially independent of the expansion or contraction of a logarithmically periodic element provided that $\alpha$ and $\tau$ remain unchanged.

The information that has been supplied above is sufficient for predicting the pattern of an array of similar end fire elements with the only difference between individual elements being the scale factor K. The method for predicting a pattern of an array could be generalized to include arrays of elements with different $\alpha$'s and possible different $\tau$'s. However, if different $\tau$'s are used, it would be necessary that the logarithm of any $\tau$ to the base of any other $\tau$ be a $\pm$ integer, i.e., $\tau' = \tau^{\pm n}$. Also, if different $\alpha$'s are used it is necessary to take into account the relative phase of the radiated field compared to the phase of the feed point current of the various logarithmically periodic elements.

*Design Procedure*

In designing an array of antennas employing logarithmically periodic antennas the designer should first determine the radiation pattern which is desired. Then, a judicious choice of the parameters and $\alpha$, $\tau$, and $\delta_N$ will have to be made so as to achieve a minimum amount of space and material to produce the desired array. It is to be noted that although the design method to be described infra is a cut and try method, a fair approximation may be obtained thereby. The procedure is the same for arrays in the E plane and in the H plane.

Given a desired beam width the equivalent aperture D may be calculated from the expression $$\frac{D}{\lambda} = \frac{40}{BW}$$

where BW is the half power beam width in degrees. The number 40 is employed instead of the number 50 (as is normally used in this design formula) because the end fire directivity of the logarithmically periodic antenna elements tends to enhance the effective aperture. The distance between the phase centers of the two outer elements (see outer elements 1 and N of FIG. 2) must be approximately D. Experimental tests indicate that a reasonable maximum spacing between the phase centers of adjacent element is 0.7 wavelengths. Thus the number of elements may be determined approximately from $$N - 1 = \frac{D}{0.7} = \frac{57.1}{BW}$$

Assume the desired bandwidth BW is 11.4° the number of elements N is then equal to 6, and D is equal to 3.5 wavelengths.

One of the limitations of the design is that the maximum value of the angle $(\delta_n - \delta_1)$ (see FIG. 2) be less than the half power beam width of an individual element. This can be understood more clearly when it is realized that the various elements radiate toward the common vertex at different angles with respect to the plane normal to the direction of radiation. If the angle $(\delta_n - \delta_1)$ is greater than the element beam width, then energy radiated in the desired direction from the end elements will be less than half of its maximum radiated energy, and will contribute relatively very little to the desired pattern of radiation. It has been found experimentally when the radiation pattern defined by the half power limits lays entirely outside the central direction of the desired main field, that the contribution of said element is primarily in the production of side lobes.

Further consideration will now be given to determine the factors controlling the angle $\delta_n - \delta_1$. It will be apparent that the larger $\alpha$ is made, the shorter the antenna element will have to be to cover a desired bandwidth. However, certain limitations on the size of $\alpha$ exist as follows. For any given frequency the wavelength $\lambda$ will be measured in some distance such as centimeters or inches. In FIG. 2 the aperture D is represented by the letter D and the difference between phase centers is indicated as $0.7\lambda$. It will also be noted that $\lambda$ bears a definite relationship to the transverse dimension of an individual element at the phase center. Such transverse dimension is not equal to $$\frac{\lambda}{2}$$

but is equal to $$\frac{K\lambda}{2}$$

where K is usually less than unity as indicated in the curves of FIG. 5. It has been found experimentally that the phase center does not lie at the half wavelength point of the antenna element. However, even though $k$ varies somewhat as $\alpha$ varies, the variation of $\alpha$ is greatly predominating. For example, if $\alpha$ is increased, the phase center will move closer to the vertex ($k$ will change only a little), thus necessitating an increase in the angle $(\delta_n - \delta_1)$ if the number of elements used and the wavelength spacing therebetween is to remain constant. Thus it can be concluded that as $\alpha$ is increased, the end elements of the array, i.e., elements 1 and elements N will tend to contribute less and less to the main field. However, by referring to FIG. 4 it can be seen that if $\tau$ is decreased, the half power beam width of the element is increased, thus tending to compensate for the increased angle $(\delta_n - \delta_1)$ necessitated by an increase in the angle $\alpha$. Further, if $\tau$ is decreased, the amount of material required for an antenna element will be decreased. However, $\tau$ cannot be decreased to too small a value or the radiation pattern of each element will tend to break up. From the foregoing discussion it can be seen that it is desirable to construct the antenna elements with as large an $\alpha$ and as small a $\tau$ as permitted by their limitations.

The limitation with respect to the parameters $\tau$ and $\alpha$ are given by the expression $$\rho = \frac{1-\sqrt{\tau}}{2 \tan \frac{\alpha}{2}} = \frac{R_N - r_n}{l_N}$$

Experimental results indicate $\rho$ should not be greater than approximately 0.4 in order to prevent element pattern breakup.

In accordance with one six element phased array the following design parameters were employed.

*Array Parameters*

| | |
|---|---|
| $\tau = .885$ | $d = 1.95$ (assumed) |
| $K = .65$ (assumed) | $N = 6$ |
| $\alpha = 9.5°$ | $R_{max} = 36''$ |

*Element Parameters*

| Element Number | Element Position $\delta_n$ | Element Phasing $\gamma_n$ |
|---|---|---|
| | Degrees | Degrees |
| 1 | 48.1 | −184 |
| 2 | 66.4 | −80 |
| 3 | 82.3 | 0 |
| 4 | 97.7 | 0 |
| 5 | 113.6 | −80 |
| 6 | 131.9 | −184 |

*Element Pattern*

| $\phi$, degrees | $f(\phi)$ |
|---|---|
| 90 | 1.000 |
| 85 | .999 |
| 80 | .995 |
| 75 | .980 |
| 70 | .955 |
| 65 | .910 |
| 60 | .840 |
| 55 | .745 |
| 50 | .635 |

In the FIGS. 10a, 10b, 10c, and 10d the predicted and measured patterns of the six element array having the aforementioned design parameters are shown. The predicted patterns are indicated by the dotted lines and the measured patterns by the solid lines. It is believed that the difference in the dotted line pattern and the solid line pattern is due in part to the mutual effects between elements in the array, which mutual effects were neglected in the calculations.

*Planar Array*

Up to this point the specific examples of arrays discussed have been of the non-coplanar type. However, the general Equation 1 will apply equally well to arrays employing planar arrangements and arrangements for producing elliptically polarized fields.

In the illustration shown in FIG. 2 each of the elements 1 through N can represent a single logarithmically periodic type element as shown, but with all such elements being rotated 90° to lie in a common plane. Alternatively, each of the elements of the sketch of FIG. 2 could represent a pair of planar elements, each pair of planar elements being arranged in a separate plane perpendicularly to the plane of the paper, as shown in FIG. 18.

A typical pair of planar elements is shown in some detail in FIG. 11. The parameters $\alpha$, $\tau$, $R_N + 1$, $r_n + 1$, $R_N$ and $r_n$ define the same parameters as in the case of the individual logarithmically periodic antenna elements of FIG. 1. The angular distance between the center line elements of the two elements is designated by the Greek letter $\zeta$. For a more detailed discussion of the two element coplanar array and its characteristics, reference is made to application, Serial Number 804,357, now Patent No. 2,989,749, mentioned hereinbefore.

FIGS. 12a, 12b, 12c, and 12d show the E plane and H plane radiation patterns of a two element planar (also referred to as coplanar herein) array for frequencies of 1400 megacycles and 1600 megacycles. The parameters of the two element array are as follows:

$\tau = .83$
$\alpha = 14°$
$\zeta = 23°$

It can be seen that the patterns are quite similar to those produced by single element antennas but with narrower beams and with smaller side lobes. The difference in the size of the side lobes is believed to be due primarily to the fact that the side lobes for the individual elements are caused by radiation from the front portion of the boom (center elements which are also employed as structural supports). When the two elements are placed together in a coplanar arrangement the currents of the two booms are out of phase which tends to cancel such radiation.

The two element arrays of the type shown in FIG. 11 can be employed as basic elements in H plane arrays. FIGS. 14, 16, and 18 show such arrays of identical coplanar elements. FIG. 14 shows typical E and H planars of a four planar array. The E and H plane radiation pattern widths shown in FIGS. 15a, 15b, 15c, and 15d were between 33° to 37° and 41° to 47° respectively and that the estimated directivity was 13.7 db to 14.8 db over an isotropic radiator.

The H plane radiation patterns of a six element array of identical elements are shown in FIGS. 17a, 17b, 17c, and 17d. The half power beam widths varied between 31° and 34° over a frequency period. The difference in the phase of the field emanating to the center two elements and the four outside elements in the direction of the main beam are, in this case, less than 30°. Consequently, very little is lost by not phasing the outside elements with respect to the center element, i.e. so that the phase of all the radiated signals is the same at a plane normal to the direction of the main beam. It is to be noted, however, that for arrays that have quite a few elements the resultant pattern will be degraded if phased elements are not employed.

It is possible with both the nonplanar array shown in FIG. 1 and the combined planar and nonplanar array shown in FIG. 18 to produce a steerable beam. FIG. 18 illustrates a multielement array whose pattern is electrically steerable over an azimuthal angle of about 140°. Over this span identical elements are equally spaced and cover an angle of almost 180°. Two or three adjacent pairs of planar elements are fed simultaneously to produce a beam in a given direction. More specifically, assume that pairs 130, 131, and 132 of planar elements are supplied with the input signal and that pairs of planar elements 133 and 134 are terminated in their characteristic impedance. The main beam will then have a direction lying along the plane of the planar elements 131. If the pairs 131, 132, and 133 of planar elements are supplied with an input signal and pairs 130 and 134 of planar elements are terminated in their characteristic impedance, the resultant main beam will be in a direction so as to be bisected by the plane of planar elements 132. Similarly, if pairs 132, 133, and 134 of planar elements are supplied with an input signal and if pairs 130 and 131 are terminated in their characteristic impedance, the resultant main beam will be bisected by the plane of planar elements 133. The half power boundaries of the H plane radiation pattern produced by the particular arrangement shown in FIG. 18 was found to vary between 29.5° and 34° over a period of frequency. It is to be noted that the manner in which the parasitic elements (the elements not actively employed in the array) were terminated had a marked effect on the degree of change in the patterns over a period. Only when terminated in their characteristic impedance was the influence of the parasites sufficiently limited to permit satisfactory patterns to be produced by the active antenna elements.

The impedance behavior of logarithmically periodic antennas can be described by a characteristic impedance and a maximum standing wave ratio with respect to said characteristic impedance. The maximum standing wave ratio is primarily a function of the angles between elements, and in arrays of more than two elements, the manner of feed and the orientation of elements within the array. The transmission line, such as a coaxial line, should be brought in from the rear of the array, as along a center element of one of the antenna elements for example, to avoid producing disturbances in the radiated field. A specific means of feeding the antenna array described herein is shown in FIG. 28 wherein a coaxial cable 151 is brought in from the rear of the antenna element along the center conductive element (not visible) of antenna element 155; the outer sheath 152 of said coaxial cable making continuous electrical contact with the aforementioned center conductive element. The outer sheath 152 terminates near the apex of antenna element 155 and the center or inner conductor 153 of the coaxial cable extends out from the sheath and is connected to the center conductive element 154 of antenna element 156. By such feed means a minimum of distortion is introduced into the radiated field pattern of the antenna array. If more than one pair of antenna elements are employed in the array, jumper means can be employed across the vertices of the pairs of antenna elements to electrically connect the outer sheath of the coaxial cable to the proper ones of each pair of antenna elements and to connect the inner conductor 153 to the proper ones of each pair of antenna elements.

A coplanar structure will generally have a higher characteristic impedance than a nonplanar structure. In both cases, as the angle ($\psi$ or $\zeta$) between elements decreases, the characteristic impedance decreases. Because of mutual effects, the standing wave ratio (SWR) increases as $\psi$ and $\zeta$ decrease. Typical figures for the two element nonplanar array are $Z_0=150\Omega$, $SWR=1.5:1$ and for the two element planar array $Z_0\pm180\Omega$, $SWR=1.7:1$. Because element pairs of a multielement array are fed in parallel, adding elements reduces the characteristic impedance.

In arrays of more than two elements, if half the elements are rotated about their (the element) axes by 180° and are fed out of phase from the previous arrangement, the currents on the transverse elements, and hence the radiation patterns, remain unchanged. When this is done the wires running radially at the ends of the transverse wires are reoriented with respect to the same wires on the adjacent element. This reorientation results in a reduction of mutual effects and hence a reduction of SWR For example, in FIG. 11, when one of the elements is rotated about its axis, the radial wires are no longer adjacent to the identical radial wires of the other element.

In the case of one four element array the SWR was reduced from 3:1 to less than 1.5:1. Generally it can be said that for all arrays of end fire elements the standing wave ratio with respect to the $Z_0$ of the array will be under 2:1 provided that phase centers are not too close together and the elements are properly oriented.

Referring now to FIGS. 20, 21, 22, and 23 there are shown various configurations of logarithmically periodic antenna elements which may be used in place of the type shown in FIG. 1, for example. Each of the antenna elements shown in FIGS. 20-23 can be employed in any of the arrays discussed up to this point. The radial dimensions $R_N$, $r_N$, $R_N{}^+{}_1$, $r_N{}^+{}_1$ correspond to similarly defined radial dimensions of the antenna elements shown in FIG. 1.

Figure 20:
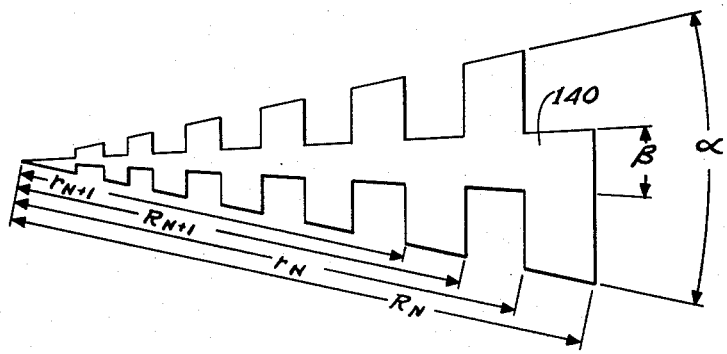
Figure 21:
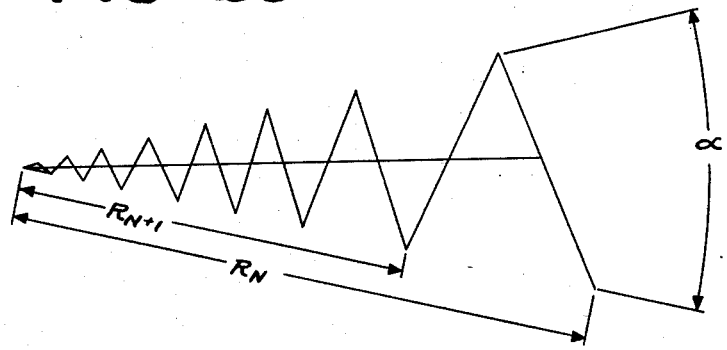
Figure 22:
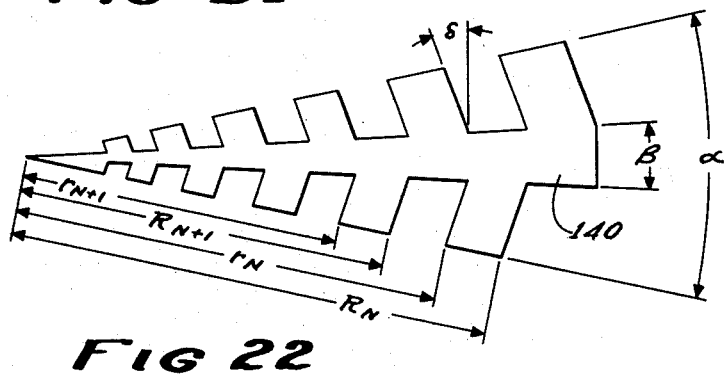
Figure 23:
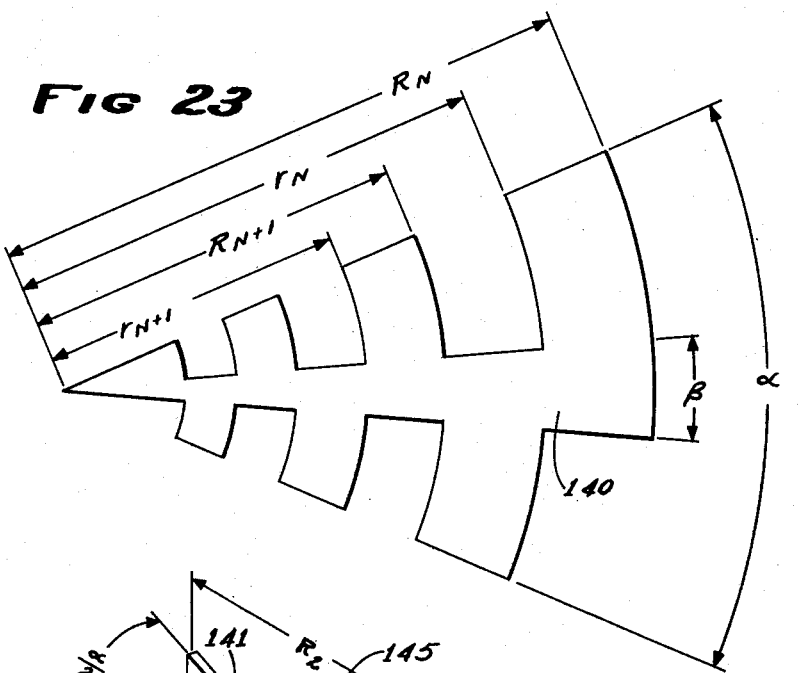

The angle $\alpha$ in the FIGS. 20-23 defines the angular limits of the antenna as in the case of the elements shown in FIG. 1. In FIGS. 20, 22, and 23 the angle $\beta$ defines the central conductive strip 140 which has been found to be desirable in logarithmically periodic antennas employing solid teeth.

The antenna elements shown in FIGS. 20-23 and also the antenna element shown in FIG. 1 may be employed in a group of four elements to produce an elliptically or circularly polarized radiation field. A plurality of these groups may then be employed to produce an array which will be capable of creating a much more directive elliptically or circularly polarized field. The vertices of the elements in each group are brought close together, but not quite touching, and the vertices of each group of the plurality of groups are brought close together but not quite touching. Each group, as indicated above, consists of two pairs of nonimage, nonplanar antenna elements arranged in quadrature. One of the two pairs is stretched by a factor $$K=\tau^{\frac{s}{2\pi}}$$

where $s$ determines the minor and major axes of the elliptically positioned field.

Each group of antenna elements has a center line passing through the vertex and about which center line the four antenna elements are symmetrically positioned. The angles between these various center lines are determined by exactly the same considerations as applied to the structures of FIG. 1 and FIG. 2; each group of elements corresponding to a single element of FIG. 1. Additionally, in order to properly phase the array, all of the radial dimensions of various groups of the elements will be stretched by some factor which will be constant for any group but which can be different for different groups of elements. Due to the fact that each group contains pairs of elements which feed against each other, the number of groups in the array can be odd or even. For a more detailed discussion of the characteristics and construction of each group of elements, reference is made to United States application Serial Number 808,373, now Patent No. 3,013,268, filed April 23, 1959, by Raymond H. Du Hamel and Fred R. Ore and entitled "Elliptically Polarized Logarithmically Periodic Antenna," said application being incorporated in full herein by reference.

Figure 24:
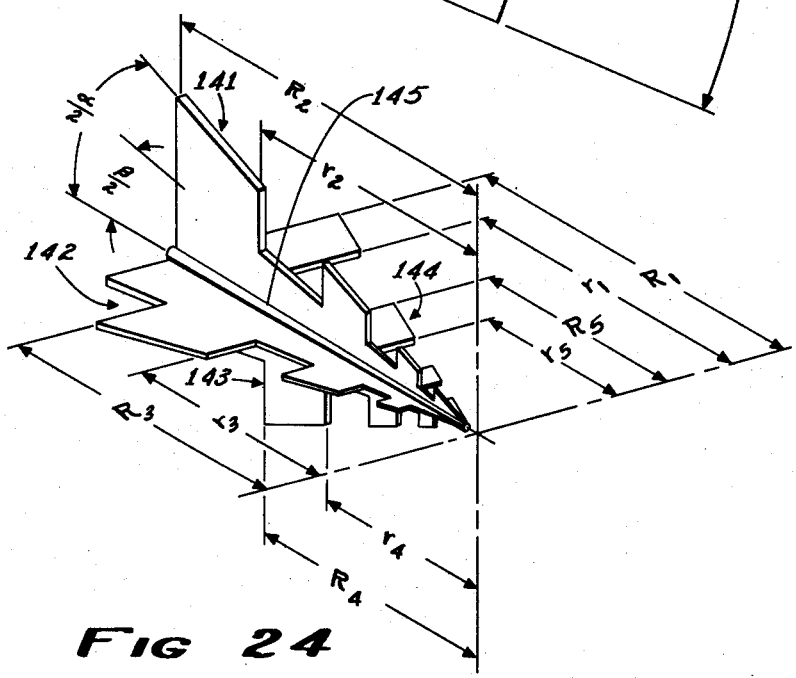

Referring now to FIG. 24 there is shown an antenna element which may be employed to produce elliptically polarized radiated fields or the special case of a circularly polarized radiated field. It will be observed that the antenna element consists of four radial elements 141, 142, 143, and 144 which are positioned around the central conducting element 145 at 90° intervals. The radial distances R and r for each radial element are indicated in the figure. The relationship of these radial distances is the same as in the case of the other antenna elements discussed herein. That is to say, for example, $$\frac{R_1}{R_5}=\tau=\frac{r_1}{r_5}$$

The radial members 141 and 143 form a pair of elements that correspond to the structure of FIG. 20 and the radial members 142 and 144 form a similar structure, with the teeth of radial member 141 being positioned opposite the gaps of the radial members 143 and the teeth of radial member 142 being positioned opposite the gaps of member 144. The radial members 144 and 142 have been stretched, however, with respect to radial members 141 and 143 respectively, by a factor $$K=\tau^{\frac{s}{2\pi}}$$

where $s$ is equal to the phase shift in radians. Specifically, if a circularly polarized radiation pattern is desired, $s$ would be equal to $$\frac{\pi}{2}$$

so that K would equal $\tau^{\frac{1}{4}}$.

Figure 25:
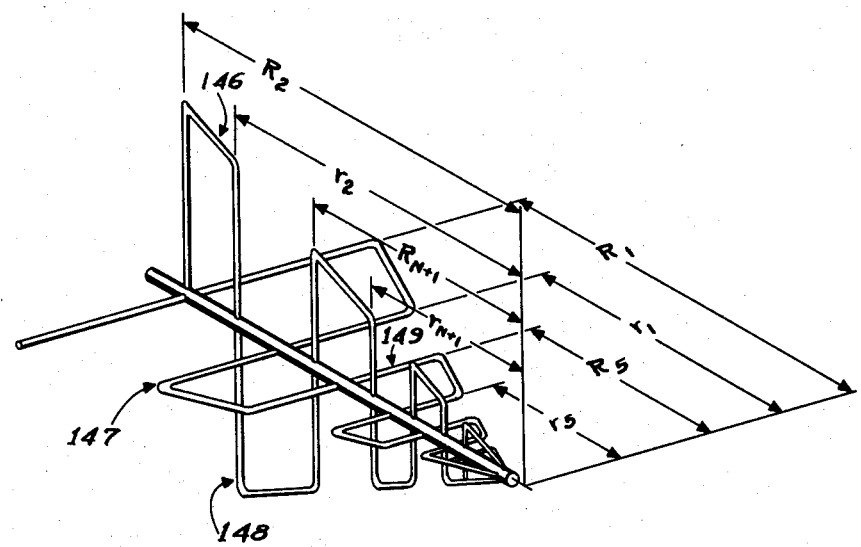

The structure of FIG. 24 as indicated above may be used in an array to form a narrow circularly polarized beam. The vertices of each of the elements as shown in FIG. 25 should be brought closely together but not touching. The array must be made up of multiples of pairs of such elements. One of the two elements of any given pair of elements being rotated 180° from the other and their center lines must be separated by an angle less than 180°.

Since an end fire array is being described, it is apparent that if the angle is more than 180°, the radiation pattern will simply be reversed 180°.

Referring now to FIG. 25 there is shown another antenna element which can be employed in an array to generate an elliptically or circularly polarized radiation pattern. The various radial dimensions designated by R and r with the different subscripts correspond to similar radial dimensions of FIG. 24. Further, the elements 146, 147, 148, and 149 correspond generally to the elements 141, 142, 143, and 144 respectively of FIG. 24. The elements 147 and 149 have been stretched with respect to the elements 148 and 146 respectively by a factor $$K = \tau^{\frac{s}{2\pi}}$$

where $$s = \frac{\pi}{2}$$

Such structure will provide a circularly polarized field.

Referring now to FIG. 26, there is shown another antenna element which can be employed in an array to generate an elliptically or circularly polarized radiation pattern. As can be seen from the figure, the array is made up of rods to form triangularly shaped teeth. It might be said that the structure of FIG. 26 is comprised of two of the type elements as shown in FIG. 21 having a common central conducting member and being positioned in quadrature with each other, and with the further proviso that one of such elements is stretched with respect to the other by a factor $$K = \tau^{\frac{s}{2\pi}}$$

where $s$ is equal to $$\frac{\pi}{2}$$

to provide a circularly polarized field.

Such relationship will produce a circularly polarized radiation pattern. It is to be noted that if $s$ were a value other than $$\frac{\pi}{2}$$

such as, for example $\frac{3}{8}\pi$, the resultant field would be elliptically polarized.

Referring now to the structure of FIG. 27, there is shown a further embodiment of an antenna element which can be employed to produce elliptically or circularly polarized radiation patterns. The structure of FIG. 27 is comprised of a pair of structures such as shown in FIG. 23 having a common center line and being spaced in quadrature with respect to each other with one of said elements being stretched with respect to the other by a factor $$K = \tau^{\frac{s}{2\pi}}$$

where $s$ determines the major and minor axes of the elliptical pattern as indicated hereinbefore.

It is to be understood that all of the antenna elements shown in FIGS. 24–27 must be used in pairs in an array with one of the elements being rotated 180° about its own center line due to the fact that the signal supplied to the two elements will be 180° out of phase. (If the two elements were images of each other, the radiation pattern would cancel at the end of the array.) Also, the vertices of the elements should be brought closely together, but not touching. The foregoing is apparent when it is considered that the two sides of a transmission line medium will be connected one each to the pair of elements.

If four or six of such elements are employed in an array such that their phase centers are at different distances from a plane normal to the direction of the main beam, all the radial dimensions of the various ones of said elements will have to be shrunk by various factors (but constant for a given antenna) in order to phase the antenna properly. Reference is made to the discussion relating to FIGS. 1 and 2 for a complete discussion of this procedure.

It is to be understood that the forms of the invention herein shown and described are but preferred embodiments thereof and that various changes may be made in circuit parameters without departing from the spirit or scope of the invention.

We claim:

1. An end-fire antenna array comprising a plurality of pairs of logarithmically periodic antenna elecents, each element comprising a vertex and at least two radial members each having one side thereof located along a common center line extending from said vertex, the bisectors of the angles formed by the common center lines of each pair of antenna elements lying in a common plane and the center lines of all of said pairs of antenna elements lying within a predetermined angular distance less than the angle of the half power main beam width radiated from a single antenna element, each of said antenna elements having its radial dimensions varied by a factor which is constant for any given antenna element but which can be different for different antenna elements to produce a radiated electric field wave whose phase bears a desired relationship to the phases of the radiated electric fields of selected ones of the other antenna elements when measured in a predetermined plane, each radial member being generally triangular in shape with the sides thereof being defined by said common center line and a radial line, said center line and said radial line format an angle $$\frac{\alpha}{2}$$

from said vertex, the vertices of all the radial elements of each antenna element being coincident with each other and being in close proximity to the vertices of all the other of said antenna elements, a plurality of conductive teeth formed in each radial member and extending generally transversely away from its center line with the outer ends of said teeth being defined by said angle $$\frac{\alpha}{2}$$

the ratio of the radial distance from the vertex to any point on a given tooth of any radial member to the radial distance from the vertex to the corresponding point on the adjacent tooth next farthest removed from said vertex and on the same radial member being a constant value $\tau$, the antenna elements of each pair of elements being positioned with respect to each other to provide a substantially balanced system to an applied input signal, transmission means comprising two conducting means for supplying an input signal to each of said pairs of antenna elements, one of said conducting means being connected to one antenna element of each of said pairs of antenna elements and the other conducting means being connected to the other antenna element of each of said pairs of antenna elements, and a central conductive member connected to said teeth along said center line.

2. An antenna array in accordance with claim 1 in which the center line members of all of said antenna elements lie substantially in the same plane and in which the predetermined plane of each of said radial members is normal to said same plane and in which adjacent antenna elements are spaced apart by predetermined angular distances.

3. An antenna array in accordance with claim 2 comprising means including said transmission means for supplying an input signal to preselectable ones of said plurality of antenna elements, and means for terminating the nonselected antenna elements in their characteristic impedance to produce a steerable radiation pattern.

4. An antenna array in accordance with claim 3 in which said teeth are formed of rods defining the periphery of said teeth, and in which said central conducting member is a center rod positioned along the center line of each of said antenna elements and connected to each of transverse portions of the rods forming said teeth.

5. An antenna array in accordance with claim 3 in which each antenna element comprises triangularly shaped teeth formed on either side of said central conductive member, said triangularly shaped teeth being formed by a plurality of straight rods connected across said central conductive member and having their ends connected to adjacent rods along the boundaries defined by the angle α, alternate rods being parallel, and the distance from the vertex of any given antenna element to the opposite ends of each rod thereon having a constant ratio.

6. An antenna array in accordance with claim 1 in which each pair of antenna elements is nonplanar, in which the center lines of the antenna elements of each pair of antenna elements lie in a plane substantially perpendicular to said common plane and in which each of the planes formed by said pairs of center line members are spaced apart predetermined angular distances.

7. An antenna array in accordance with claim 6 comprising means for supplying input signal to preselectable ones of said plurality of pairs of antenna elements, and means for terminating the nonselected pairs of antenna elements in their characteristic impedance to produce a steerable radiation pattern.

8. An antenna array in accordance with claim 7 in which said teeth are formed of rods defining the periphery of said teeth, and said central conducting member comprising a center rod positioned along the center line of each of said antenna elements and connected to each of transverse rods forming said teeth.

9. An antenna array in accordance with claim 7 in which each antenna element comprises two radial members lying in the same plane and triangularly shaped teeth formed on either side of said central conducting member, said triangularly shaped teeth being formed by a plurality of straight rods connected across said central conducting member and having their ends connected to adjacent rods along the boundaries defined by the angle α, alternate rods being parallel, and the distances from the vertex of each anennna element to the opposite ends of each rod having a ratio γ.

10. An antenna array in accordance with claim 1 in which each antenna element comprises two radial members lying in the same plane, in which each pair of antenna elements is coplanar and in which the planes formed by the center line elements of each pair of antenna elements are substantially perpendicular to said plane and are separated from each other by predetermined angular distances.

11. An antenna array in accordance with claim 1 comprising means including said transmission means for supplying an input signal to preselectable pairs of said plurality of pairs of antenna elements, and means for terminating the nonselected pairs of antenna elements in their characteristic impedance to produce a steerable radiation pattern.

12. An antenna array in accordance with claim 11 in which said teeth are formed of rods defining the periphery of said teeth, and said central conducting member comprising a center rod positioned along the center line of each of said antenna elements and connected to each of the transverse rods forming said teeth.

13. An antenna array in accordance with claim 11 in which each antenna element is comprised of triangularly shaped teeth formed on either side of said central conducting member, said triangularly shaped teeth being formed by a plurality of straight rods connected across said central conducting member and having their ends connected to adjacent rods along the boundaries defined by the angle α, alternate rods being parallel, and the distances from the vertex of each antenna element to the opposite ends of each rod having a constant ratio γ.

14. An antenna array in accordance with claim 1 in which each antenna element comprises more than two radial members connected along a common center line and symmetrically arranged therearound, the radial distance from said vertex to all points on any given tooth bearing a constant relationship to corresponding points on the tooth next adjacent to said given tooth next farthest removed from said vertex and on the same radial section, the teeth of said radial members of each antenna element aligned along a logarithmical spiral beginning at the vertex of said antenna element.

15. An antenna array in accordance with claim 14 comprising means including said transmission means for supplying an input signal to preselectable ones of said plurality of antenna elements, and means for terminating the nonselected antenna elements in their characteristic impedance to produce a sterable radiation pattern.

16. An antenna array in accordance with claim 15 in which each antenna element comprises four radial members arranged 90° apart about said central conductive member, each oppositely positioned pair of radial members comprised of triangularly shaped teeth formed by a plurality of straight rods connected across said central conductive member and having their ends connected to adjacent rods along the boundaries defined by the angle α, alternate rods being parallel, and the distance from the vertex of any given antenna element to the opposite ends of each rod thereon having a constant ratio.

17. An antenna array in accordance with claim 15 in which each radial member is generally triangular in shape and in which each tooth has inner and outer sides which define arcs with said vertex as the center.

18. An antenna array in accordance with claim 1 in which said antenna elements are arranged to form a plurality of groups of antenna elements, each of said groups of antenna elements comprises two pairs of nonplanar antenna elements positioned symmetrically about a line passing through the vertex, said two pairs of nonplanar antenna elements having closely adjacent apexes, one pair of antenna elements being positioned perpendicularly with respect to the other pair of antenna elements, the antenna elements of each pair of antenna elements being non-image elements, said transmission means having said first conductor connected to the vertices of one element of each pair of elements, and said second conductor connected to the vertices of the other antenna element of each pair of antenna elements, and the two elements of one of said pair of elements having the radial distance of any given point on its teeth measured from the vertex bearing a ratio to the radial distances of the corresponding point on the teeth of the two elements of the other pair of elements equal to $$\frac{s}{\tau^{-2\pi}}$$

where $s$ is amount of stretch in radians.

19. An antenna array in accordance with claim 18 comprising means including said transmission means for supplying an input signal to preselectable groups of said plurality of groups of antenna elements, and means for terminating the non-selected groups of antenna elements in their characteristic impedance to produce a steerable radiation pattern, and in which each antenna element is comprised of two radial sections lying in the same plane.

20. An antenna array in accordance with claim 19 in which said teeth are formed of rods defining the periphery of said teeth, and said central conductive member comprising a center rod positioned along the center line of each of said antenna elements and connected to each of the transverse portions of the rod forming said teeth.

21. An antenna array in accordance with claim 19 in which each antenna element comprises triangularly shaped teeth formed on either side of said central conductive member, said triangularly shaped teeth being formed by a plurality of straight rods connected across said central conductive member and having their ends connected to adjacent rods along the boundaries defined by the angle α, alternate rods being parallel, and the distance from the apex of any given antenna element to the opposite ends of each rod thereon having a constant ratio.

22. An antenna array in accordance with claim 15 in which each antenna element comprises four radial members arranged 90° apart about the common central conductive member, the teeth of each oppositely positioned pair of radial members being formed of rods.

References Cited in the file of this patent

UNITED STATES PATENTS

| Re. 20,922 | Lindenblad | Nov. 22, 1938 |
| 1,898,058 | Lindenblad | Feb. 21, 1933 |
| 2,664,507 | Mural | Dec. 29, 1953 |

OTHER REFERENCES

Broadband Logarithmically Periodic Antenna Structures by Du Hamel & Isbell, pages 119–124, March 1957, IRE Convention Record, Part I, vol. 5.

Logarithmically Periodic Antenna Designs by Du Hamel and Ore, March 1958, IRE Convention Record, Part I, pages 139–151.